Aug. 27, 1929. C. A. MICHEL 1,726,447
GLASS FOR TAIL LAMP STOP SIGNALS AND REVERSE LIGHTS
Filed Jan. 10, 1923 2 Sheets-Sheet 1
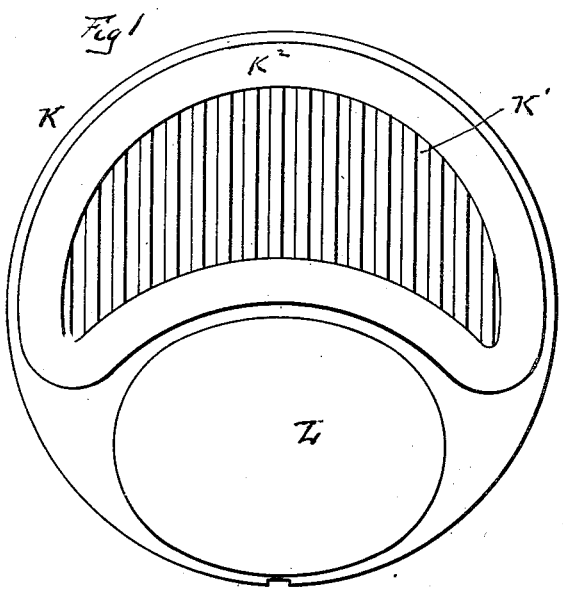
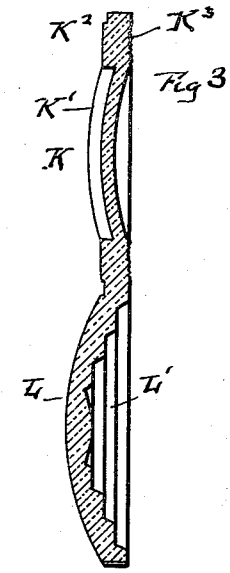
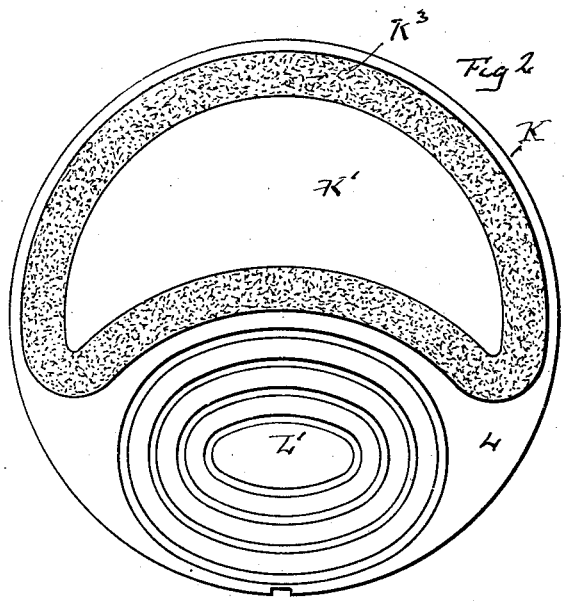
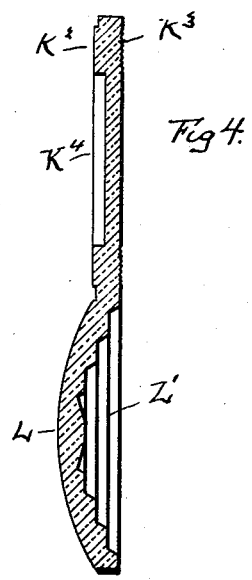
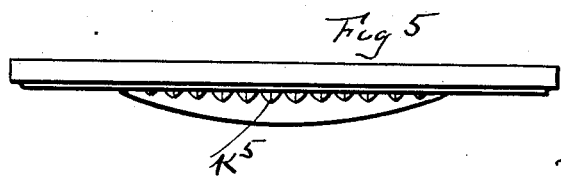
Inventor
C. A. Michel
By
Attys.

Aug. 27, 1929.  C. A. MICHEL  1,726,447
GLASS FOR TAIL LAMP STOP SIGNALS AND REVERSE LIGHTS
Filed Jan. 10, 1923   2 Sheets-Sheet 2
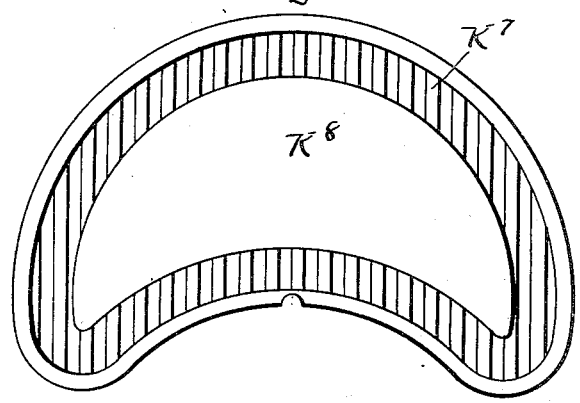
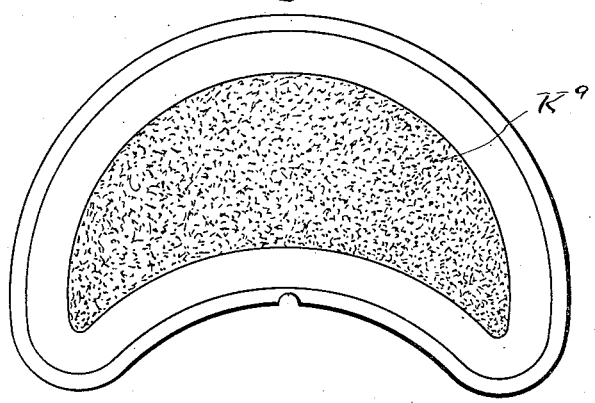
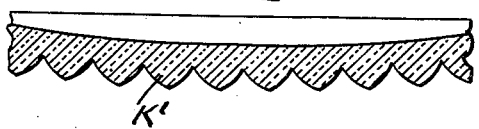
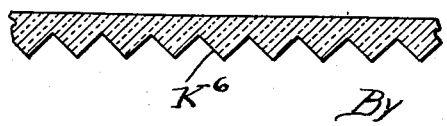
Inventor
C. A. Michel
By
Hull Brock & West
Attys.

Patented Aug. 27, 1929.

1,726,447

UNITED STATES PATENT OFFICE.

CLARENCE A. MICHEL, OF CLEVELAND, OHIO, ASSIGNOR TO DELCO REMY CORPORATION, OF DAYTON, OHIO, A CORPORATION OF DELAWARE.

GLASS FOR TAIL-LAMP STOP SIGNALS AND REVERSE LIGHTS.

Application filed January 10, 1923. Serial No. 611,729.

This invention relates generally to tail lamps and more particularly to the construction of the glass employed in said lamps.

The glass or glasses constituting the subject-matter of this invention are particularly adapted for use in connection with a combination tail lamp, stop signal and reverse light shown and described in my application of even date herewith, although it will be understood that this glass or glasses can be used in connection with other forms of lamps.

Automobile tail lamps as usually constructed are provided with a lenticular glass red in color and stop light signals arranged upon the rear of an automobile have also been provided with a red glass so formed as to provide brilliant illumination in part or in whole so as to provide a visible signal either during the day or night.

It is also desirable to illuminate the space directly at the rear of the vehicle when the same is being reversed or backed and it is the object of my invention to provide a glass or glasses which can be used in connection with a lamp which will serve the three functions above mentioned, namely, the ordinary tail lamp, stop signal and the reverse or backing light.

These objects I accomplish by the peculiar construction of the red glass or glasses used in connection with the lamp and it will be understood that these various features can be combined in a single glass or in separate glasses as preferred, as for manufacturing purposes it may be easier and more convenient to make them separately.

In the drawings forming a part of this specification,

Figure 1 is a front view of a glass constructed in accordance with my invention;

Figure 2 is a rear face view of the same;

Figure 3 is a vertical sectional view thereof;

Figure 4 is a vertical sectional view showing a slight modification;

Figure 5 is an edge view of the same;

Figure 6 is a front view of the upper half of the glass when the same is made in two sections;

Figure 7 is a rear view thereof;

Figure 8 is a cross sectional view of the prismatic portion of the glass; and

Figure 9 is a view showing a slightly modified form of such prismatic portion.

I shall first describe the construction of the glass in which all of the parts are made integral. The glass is made circular in form and is red in color throughout. The upper portion of the glass K is intended for service with the combined stop signal and reverse light and the lower portion L is intended to serve in connection with the ordinary tail light and this lower portion L is lenticular in form and provided with any suitable prismatic formation upon the inner face thereof as indicated at L'.

The main portion of the upper part K is formed with parallel vertical prismatic portions K' upon the outer face thereof and this prismatic portion is surrounded by flat border portion K² and the inner face of this border portion is stippled as indicated at K³.

The prisms K' can be curved downwardly as shown in Figure 3 or they may be made straight as shown at K⁴ in Figure 4.

By means of a glass constructed as described when used in connection with a lamp having at least two incandescent lamps arranged therein, the lower portion L will be arranged opposite the ordinary incandescent tail lamp which is constantly illuminated whereas the portion K will be arranged opposite the incandescent lamp of highest candle power and which is illuminated only when the vehicle is stopping or the speed thereof being checked or when the vehicle is being backed and when this incandescent lamp of greater candle power is illuminated, the portion K² will be brilliantly illuminated thereby serving as a stop signal and by virtue of the prismatic formation K', the rays of light passing therethrough will be spread laterally so as to illuminate a considerable space and this feature is valuable in connection with a tail lamp intended to be used for providing sufficient light directly at the rear of the vehicle when said vehicle is being backed.

Instead of making the device in a single glass as indicated in Figures 1, 2 and 3, the glass may be made in two separate pieces as indicated in Figure 4. Furthermore when the separate pieces are employed, the upper portion may be made as shown in Figures 1 and 2, that is, with the prismatic portion at the center or the prismatic portion can be arranged around the border as indicated at K⁷ in Figure 6 and the central portion plain as indicated at K⁸ and then the rear face of this central portion is stippled at K⁹ in Figure 7.

In the construction shown in Figures 6 and 7 the prismatic portions would serve to distribute the light laterally exactly the same as previously described and the stippled portion K⁹ would serve the purpose of a stop signal inasmuch as this would be the brilliantly illuminated portion when the switch is cut on due to the application of the brake or clutch.

In the formation of the prisms they may be made with slightly rounded faces as shown in Figure 8 or they may be made with perfectly flat faces as indicated at K⁶ in Figure 9.

It will also be understood that the prismatic portions may be graduated as indicated in Figure 5, that is, the prisms at the center being of the greatest depth and gradually diminishing in depth towards the sides. Other combinations of prismatic faces and stippled portions may be employed for the purpose of effecting the combination of brilliant illumination at certain parts and lateral distribution of the light rays at other portions.

What I claim is:—

1. A glass for the rear lamp of a vehicle comprising a diffusive portion for effecting a comparatively brilliant illumination and a portion for effecting a lateral distribution of the light rays, one of said portions forming a border about the other portion.

2. A glass for the rear lamp of a vehicle comprising a portion having vertically disposed ribs formed thereon to provide lateral distribution of the light rays and a diffusive portion for effecting diffusion of the light rays, one of said portions forming a border about the other portion.

In testimony whereof, I hereunto affix my signature.

CLARENCE A. MICHEL.